US008417585B2

(12) United States Patent
Durham, III et al.

(10) Patent No.: US 8,417,585 B2
(45) Date of Patent: Apr. 9, 2013

(54) SEARCH METHODS FOR CREATING DESIGNS FOR MERCHANDISE

(75) Inventors: Fred Edward Durham, III, Palo Alto, CA (US); Marty Lee McKolskey, Alameda, CA (US)

(73) Assignee: Cafepress.com, San Mateo, CA (US)

( * ) Notice: Subject to any disclaimer, the term of this patent is extended or adjusted under 35 U.S.C. 154(b) by 0 days.

(21) Appl. No.: 12/554,843

(22) Filed: Sep. 4, 2009

(65) Prior Publication Data

US 2011/0060437 A1 Mar. 10, 2011

(51) Int. Cl.
G06Q 30/00 (2012.01)
(52) U.S. Cl.
USPC .......................... 705/26.5; 705/27.1
(58) Field of Classification Search ............... 705/26, 705/26.1–27.2
See application file for complete search history.

(56) References Cited

U.S. PATENT DOCUMENTS

| | | | |
|---|---|---|---|
| 6,504,559 B1 | 1/2003 | Newton et al. | |
| 7,329,631 B1 | 2/2008 | Burnett | |
| 2001/0044758 A1* | 11/2001 | Talib et al. | 705/27 |
| 2003/0182210 A1* | 9/2003 | Weitzman et al. | 705/27 |
| 2005/0177453 A1* | 8/2005 | Anton et al. | 705/26 |
| 2005/0289018 A1* | 12/2005 | Sullivan et al. | 705/27 |
| 2006/0004638 A1 | 1/2006 | Royal et al. | |
| 2008/0104040 A1 | 5/2008 | Ramakrishna | |
| 2009/0294045 A1 | 12/2009 | Marino et al. | |

OTHER PUBLICATIONS

Michael, J. M. (1997). Pictures, pictures, everywhere. Popular Photography, 61(10), 40-50+.*
International Search Report Issued Oct. 22, 2010 for PCT/US2010/047639.

* cited by examiner

*Primary Examiner* — Jeffrey A. Smith
*Assistant Examiner* — Resha Desai
(74) *Attorney, Agent, or Firm* — Nixon Peabody LLP

(57) ABSTRACT

Systems and methods are described for creating designs that can be imprinted on articles of merchandise. A wide range of designs may be selected by purchasers of customized merchandise, for one-off production or for production small or large quantity, without significantly compromising cost and speed of production. An online platform for selecting and combining designs in order to create customized merchandise that can be automatically manufactured. Searches of large design databases comprising uniquely identified design elements are enabled. The design elements can include one or more of fonts, colors, themes, shapes and images. Results of the searches can be selectively incorporated in customizable designs and can be embodied in merchandise.

18 Claims, 5 Drawing Sheets

SEARCH METHODS FOR CREATING DESIGNS FOR MERCHANDISE

BACKGROUND OF THE INVENTION

1. Field of the Invention

The present invention relates generally to systems and methods for locating, designing and creating merchandise.

2. Description of Related Art

There is a market for customized merchandise such as clothing, ceramics, plastics and wearable pins. Customizing clothing merchandise includes imprinting a design on shirts, jackets, sweaters, etc. Designs may also be applied to coffee mugs and any other vessels to which designs can be applied. Conventional methods for producing small batches of customized merchandise are limited by one or more of time, cost, choice and ease of manufacture. In order to reduce turnaround time from ordering to delivery of finished goods and to maintain costs at commercially competitive levels, choice of designs are generally limited to reduce manufacturing cost.

BRIEF SUMMARY OF THE INVENTION

Aspects of the present invention provide a system and method that enables the creation of a unique design through the process of searching and/or submitting a query. Certain embodiments of the invention comprise systems and methods and an online platform for selecting and combining designs in order to create unique designs and merchandise based on a user's query. Once the design has been created it can be automatically manufactured in quantities of one or more. According to certain aspects of the invention, searches of large databases that comprise and/or maintain uniquely identified design elements are enabled. The design elements can include one or more of fonts, colors, themes, shapes and images. Results of the searches can be selectively incorporated in unique designs and/or can be embodied in merchandise.

Systems constructed according to certain aspects of the invention permit a user to interact with a database of design elements through an on-line network and services may be provided that interact with product production, fulfillment, and distribution.

DETAILED DESCRIPTION OF THE INVENTION

Figure 1:
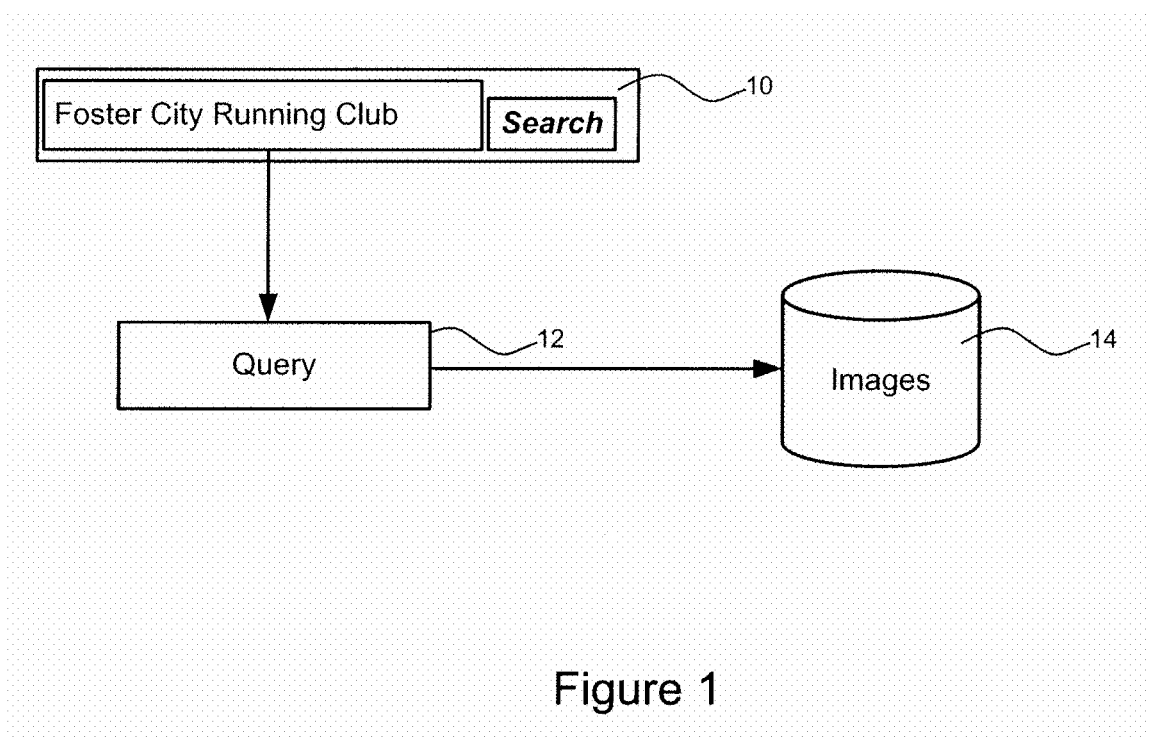
FIG. 1 illustrates query processing according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods for designing and creating designs and for creating customized merchandise utilizing the designs. Users of the system can enter words, phrases and concepts that are used to search for merchandise, designs and design elements. Search results may be used to create new designs and to select an item to which the new designs can be applied. The design and item combination can then be ordered and automatically transmitted for manufacture and/or customization. Any desired quantity of the design-modified item may be produced. For example, a single instance of a coffee mug may be easily produced in this manner.

Methods for creating a design and merchandise carrying the design typically include a user entering a search query, using terms derived from the search query to search and locate design elements from a repository of design elements, creating a design using retrieved elements and then placing the designs on merchandise. Design elements can include graphics such as photographic images, illustrations and drawings. Design elements may also include fonts, slogans, proverbs, phrases, quotations, names, color schemes, layouts, backgrounds, watermarks, textures, borders, layers and other components that may be added to a design. In operation, the newly created/selected design may be automatically applied to merchandise such as clothing (e.g. T-shirts), vessels such as coffee mugs, wearable buttons and other articles capable of receiving an imprint or image.

In certain embodiments, designs and design components may be characterized by content, application and/or associations. For example, uniquely identified design elements may be searched where design elements comprise fonts, colors, themes, shapes and images. FIG. 1 depicts a simplified example of a search for design elements. A query 10 is created, typically using natural language describing a theme or the types of designs sought. In the example, the query 10 includes a theme: "Foster City Running Club." The query can be used as a search term, but in many embodiments, the query can be analyzed to produce additional search terms such as "Foster City" and "Running Club." A search is executed against database 14 based on the query and, where appropriate or desired, on the additional search terms. As will be appreciated, the search terms can be obtained in a process by which query 10 is analyzed, expanded, refined and processed to create an expanded structured query 12 for searching database 14. In one example, query 10 may be amended to qualify "Foster City" as a location and "Running Club" as a type of organization; moreover, "Foster City, Calif." may be substituted if, for example, the user submitting the search is known to reside in California.

Figure 2:
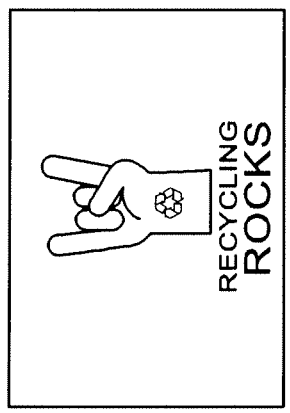
FIG. 2 illustrates examples of designs comprising design elements.
Figure 2:
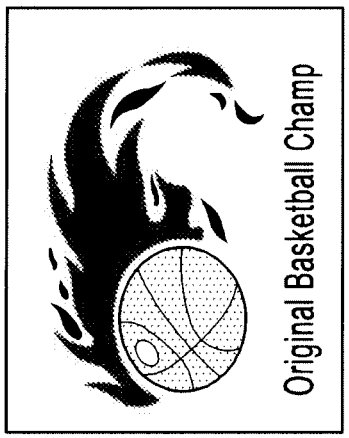
Figure 2:
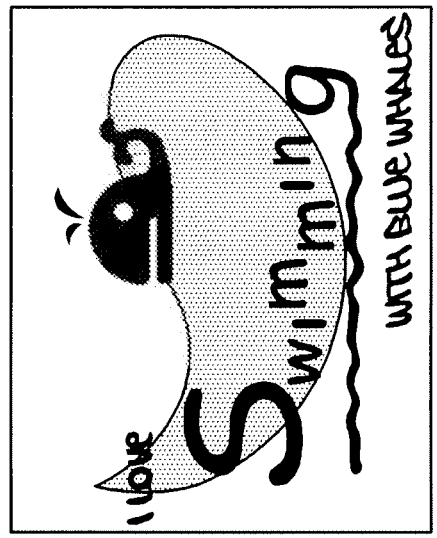

A catalogue of designs, design elements and merchandise may be provided to assist searching and designs. Design elements and merchandise that meet user selected criteria may be located based on a search of the catalogue. The examples of FIG. 2 show designs 20, 22 and 24 that comprise multiple design elements. For example, a "whale design 24 includes a background, two drawings of whales, a color scheme and fonts consistent with a theme defined by the sentence "I love swimming with blue whales." Each of these design elements may be found in a catalogue and associated with one or more search terms including, for example, whale, swim/swimming, blue and combinations of these terms. A user will typically review the search results and identify components to be included in the design. The user may also manipulate the components by selecting position, scaling, color and other attributes of the individual components within the design. Upon completion of the design, the user can select merchandise to which the design may be applied. The design may be presented on images of the merchandise to allow the user to visualize the final product. The user may rescale the design based on appearance of selected merchandise and may select attributes of the merchandise, including color, size, style and materials. In the example of a T-shirt, a user may select between male/female sizing, colors, styles (e.g. pocket-tee), fabric and so on. The user may then place an order for the final merchandise, specifying quantity, delivery details, form of payment, packaging, etc. The item may then be automatically transmitted for manufacture according to user specifications.

Figure 3:
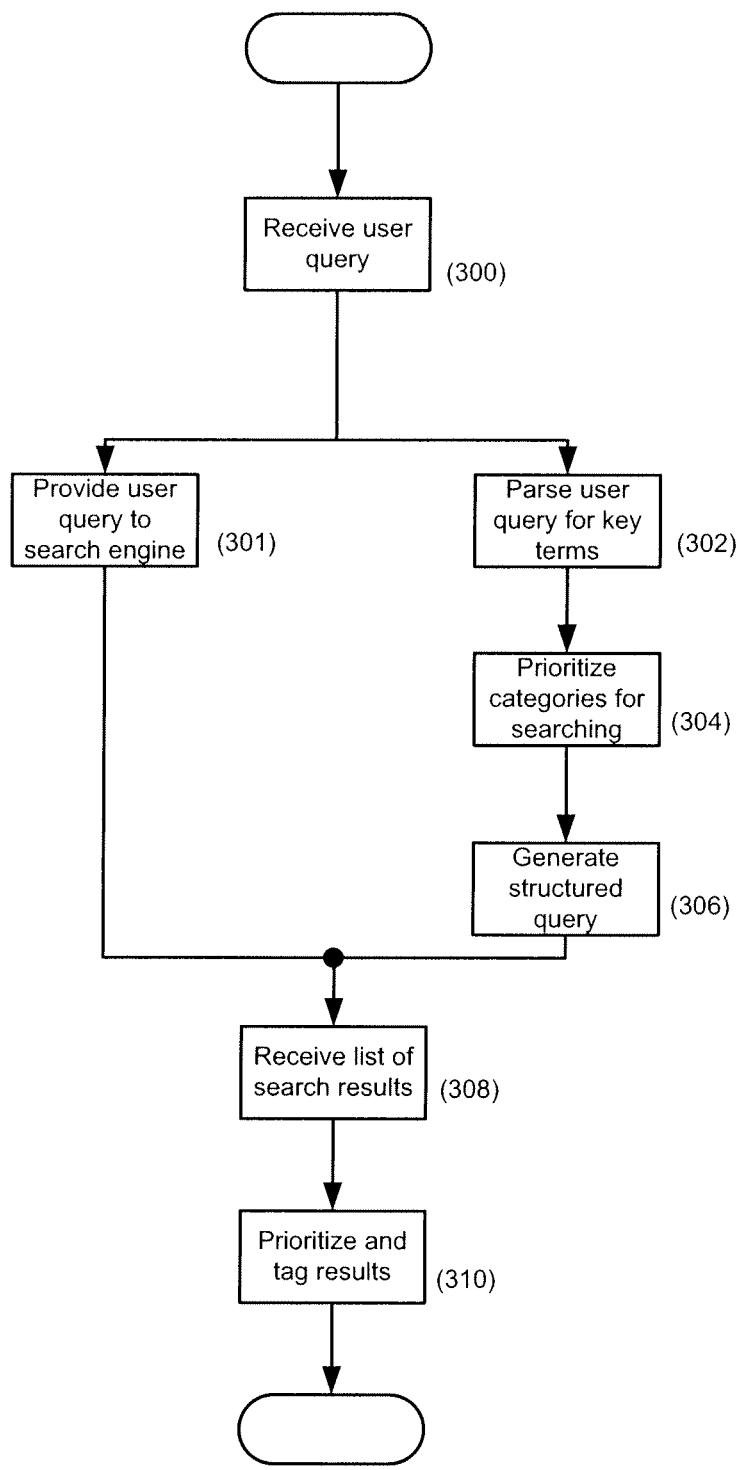
FIG. 3 is a flowchart showing an example of a process for creating designs according to certain aspects of the invention.

With reference to FIG. 3, and as noted above, searches are conducted based on a user query. The user query, received at step 300, can be presented 301 as a natural language query to a search engine or other search tool that searches for word and phrase matches. The user query 10 may be submitted without modification may provide a list search results at 308 that includes a broad variety of designs or design elements associated with terms matching portions of the user query. The list of matches can be optionally prioritized based on the number of words matched and the ordering of those words. For example, this approach would list matches to the phrase "Running Club, Foster City" ahead of an item associated with the sentence: "Joe Foster now running City Club.

In certain embodiments, structured queries may be generated at from the user query received at step 300. User queries may be parsed at step 302 for key terms and phrases. The key terms and phrases may be identified based on prior searches, dictionaries of phrases and other methods known in the art. The key terms and phrases may then be used to identify and prioritize categories of designs and design elements for searching 304. The categories may be prioritized in order to identify one or more databases, catalogues and/or portions of databases and catalogues that are likely to yield suitable results. Prioritization can be based on factors including user preferences, system configured parameters, demographics of the user and a history of prior searches performed by the user or by other users.

At step 306, a structured query can be generated using user provided search terms (i.e., the user query) and the categories to direct the search for designs, design elements and merchandise. The structured query may be used to search of large repositories of designs and design elements maintained in one or more design databases. Queries may be automatically targeted to certain categories of design and merchandise based on a combination of preconfigured user preferences, by a history of searches and selections by the user and by a history of searches and selections by other users. Responses to queries can be reviewed by the user and desired elements and/or designs can be selected for incorporation in a customized designs and/or embodiment in merchandise. The structured query 10 may be submitted without modification may provide a list search results at 308 that includes a broad variety of designs or design elements associated with terms matching portions of the user query.

Search results can be optionally prioritized and tagged at step 310. Prioritization can be based on the number of words matched and the ordering of those words and search results can be sequenced for presentation based on a history of searches and user selections in order to improve system performance. Thus, adaptive prioritization schemes may weight results based on previous user selections of the results of similar queries. Various weights may be applied including, user-specific weights based on a history of selections by the current user and global weights based on an aggregated history of selections by users of the system. In some embodiments, user amendments of queries may be monitored and recorded to improve query processing and to provide prioritization parameters for results listing. For example, processing of queries may be adjusted based on prior queries having similar search terms that were amended subsequent to results listings.

According to certain embodiments of the invention, designs are modified and created from design elements revealed by the search. These designs may result from amending one or more pre-existing design elements. For example, if a user enters a query that includes "blue whale," then the designs to the user may include a whale image that has been colored blue with text formatted according to characteristics gleaned from the query.

Designs and design elements may be tagged in response to prioritization and selection of search results by a user, thus improving future searches. Tagging can be used to identify associations of the design or design element with, categories, themes, key words and other information that may be used to assist searching. In that regard, tagging can facilitate other search operations, including searches performed on the Internet. Thus, an Internet search for blue whales may yield image 24 from FIG. 2 with a link to a website constructed according to certain aspects of the invention. In one example, information related to search results and associated newly created designs can be provided to update a search engine index of a website operating according to certain aspects of the invention.

In certain embodiments, the process of searching may include global and user-specific weightings. In general, a query that includes the keyword "cats" may cause the system to populate a set of results with pre-existing designs and design elements associated with feline animals and images associated with the musical named "Cats." If a user selects a presented design that includes the feline animal, then results of future searches requested by the user and based on a query that includes the word "Cats" may be populated with more animal-related designs and design elements than musical designs and design elements. Moreover, if the user selected a design having a particular breed of cat—e.g. a Siamese cat—then future search results may be weighted to favor inclusion of designs and design elements related to Siamese cats.

In certain embodiments, search results may be dynamically and/or hierarchically reordered based on user interest in the presented designs. In these embodiments, a first design may be created from design elements ordered by known user preferences. In the "Cats" example, the listing of designs and design elements matching the search terms may be dynamically ordered in favor of animals if the user has previously selected designs related to household cats. If the user has selected a predominance of Siamese cats, the list may be reordered to present Siamese cat designs prominently.

In certain embodiments, designs and design elements may be searched based on image, color and words correlated to one or more libraries identifying and/or indexing designs and design elements by image, design and text. In at least some embodiments, metadata associated with designs and design elements in the library may be catalogued. Metadata may include information about a design or design element such as a written description of the design, copyright information, artist information, context information, reviews and other searchable information. A query may search metadata as a primary index of catalogued images and/or as a method for prioritizing selection of a design or design element.

Referring again to FIG. 2, searches may be multidimensional in character, where dimensions can include topics, colors, categories, styles, etc. and adaptability of searching may be limited in one or more dimensions. In one example, a series of searches may include submission of a sequence of three search queries: (a) "Recycling Rocks," (b) "Original Basketball Champ" and, (c) "I love swimming with blue whales," where the user selects results 20, 22 and 24 (respectively). It will be appreciated that the topics of the searches are significantly different and this sequence would be unlikely to influence weighting of searches or modifying queries, even if the individual queries have such influence. However, the selected images may exhibit a common style that could lead to a reordering of future search results. In the example, drawings/illustrations are selected while other searchable dimensions, such as color selections, color palettes, dimensions and font selections vary. In this example, future searches by the user may prioritize images accordingly by de-emphasizing photographic images of whales in favor of line drawings, etc.

Figure 4:
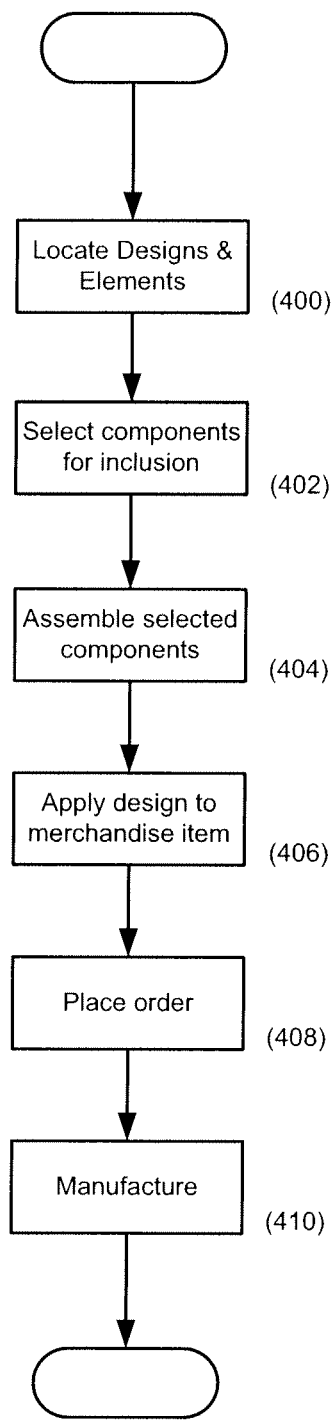
FIG. 4 is a flowchart showing an example of a process for designing and manufacturing merchandise according to certain aspects of the invention.

FIG. 4 describes a simplified example of a process for producing merchandise commencing with a user query, and according to certain aspects of the invention. At step 400, a search is conducted based on the user query. In one example, the user interacts with the system using a device such as a computer, a cell phone, a mobile computing device, a network enabled television, a gaming station or other suitable device. The user may further interact with the system using a web browser, mobile application, voice response system or through any available interactive system. In one example, the user logs on to the system through a web site and provides the query. The user may first select a context for the query and may set certain parameters for the search that, for example, limit the field of search and/or prioritize certain types of designs and/or design elements.

At step 402 the results are presented to the user for browsing. Results may be stored in any suitable format including, for example, JPEG, Bitmap (BMP), PCX, GIF, etc. and/or in vector graphic formats such as SVG format files. The images may be stored and/or displayed in any combination of formats suitable for display by the user device, including thumbnails, in a gallery, in scrollable lists and so on. Display elements may then be assembled and arranged at step 404 to obtain a design. In some embodiments, the user can manipulate the various elements and can specify new or different attributes for the elements.

When a design has been created that is acceptable to the user, the user may be prompted to select an item of merchandise to carry the design at step 406. To assist in this process, certain embodiments provide a configuration/selection tool that allows the user to review the design as it would appear on available merchandise. Typically, an image of the design is mapped to an image of the merchandise to represent the appearance of the finished product. For example, the design may be shown on an assortment of articles such as coffee mugs, T-shirts, sweat-shirts, hats, etc. Colors, sizes, styles and other attributes of the various articles can be shown. The user can select one or more of the articles for purchase.

At step 408, the user can place an order for the manufacture and delivery of the merchandise articles carrying the user-created design. The user can select methods of payment, delivery addresses and quantities of the various articles using methods that are known in the art. However, the user can opt to have a single article produced, to have multiple copies of a single article produced and/or to group different articles to carry the new design.

Upon completion of the order process, the ordered merchandise is automatically sent for manufacturing at step 410. The process of manufacturing may include preprocessing of the design to match colors and improve quality of reproduction of images and text in the design. In some embodiments, this manufacturing preprocessing can be at least partially incorporated into step 406 such that the user can validate any changes required by the manufacturing process.

At various stages of the process, entries identifying or associated with the user created design and design elements are made in one or more indices used for storing the design and for searching for designs and design elements at a later time. An index may identify the design by a system created reference identifier, which may be in the form of a number and a taxonomy used to categorize the design according to one or more dimensions. The index in this case typically relates the design to the taxonomy entry and to other information. The index may also be used by network search tools such as World Wide Web search engines. For example, a website or web page may be tagged with information that is incorporated into a search engine index.

Other information can used to search for designs and design elements. Other information can include tags that identify content, metadata, licensing information and other bibliographical information of the design. Metadata may be directly linked to, or referenced by the design through a tag or the system index. However, metadata may be shared among multiple design elements and may be used to group designs by theme or other characteristic in common. For example, a search for "swimming with Blue Whales" may include a search of related groups that include dolphins painting, blue whales, whale tail, whale watching, killer whales, aquaria, orca, scuba diving, marine life, diving and so on.

In certain embodiments, information gathered from the search process may be collated and used for marketing purposes. For example, purchases of merchandise, designs and/or design elements resulting from a search may be reported to enable analysis of sales activities, management of inventory and pricing strategies. Purchases may be directed to third party organizations, such as franchises and operations in foreign countries and recording of referrals may be used for billing and other purposes. Trend analysis of marketing information can be performed in real time and alerts can be generated based on changes and/or unusual activities related to the system.

In certain embodiments, searches may be limited or constrained based on system configuration and user provided parameters. User parameters may be set as a general preference of the user and/or as a selection of the search. User parameters may operate to limit searches to text-based searches without system processing of queries and/or prioritization of results. User parameters may filter marketing components of results such that only images are returned. Other limitations that may be set by users can include searches by geographic location, selection of product types (e.g. T-shirts only) and so on. The system may similarly constrain the searches of users and may impose certain other constraints. For example, the system may remove offensive terms and trademarked terms in queries and/or results. To this end, designs may be tagged to identify applicability of content-specific restrictions. The system parameters may also identify designs that are to be concealed or excised from the catalogue.

In certain embodiments, a design or design element selected by searching a repository, archive and/or database of designs can be melded onto an underlying layer of material that is then cut out and applied onto a final surface to produce an appliqué as described in U.S. patent application Ser. No. 12/477,758, which is incorporated herein by reference.

Certain embodiments comprise system and methods for creating single or low unit batches of merchandise or products including a design or design elements obtained by searching a repository, archive and/or database of designs. A design or design element can be simply printed onto fabric, adhered to cloth backing, cut as desired, and attached to a garment or other product. Examples of such systems and methods may be found in U.S. Patent No. 61/108,160, which is incorporated herein by reference.

Certain embodiments comprise system and methods for transferring an image of the design or design element onto ceramic and other materials using, for example, the sublimation transfer methods disclosed in U.S. Pat. No. 7,329,631. Such techniques can be used to produce designs of coffee mugs and the like.

System Description

Figure 5:
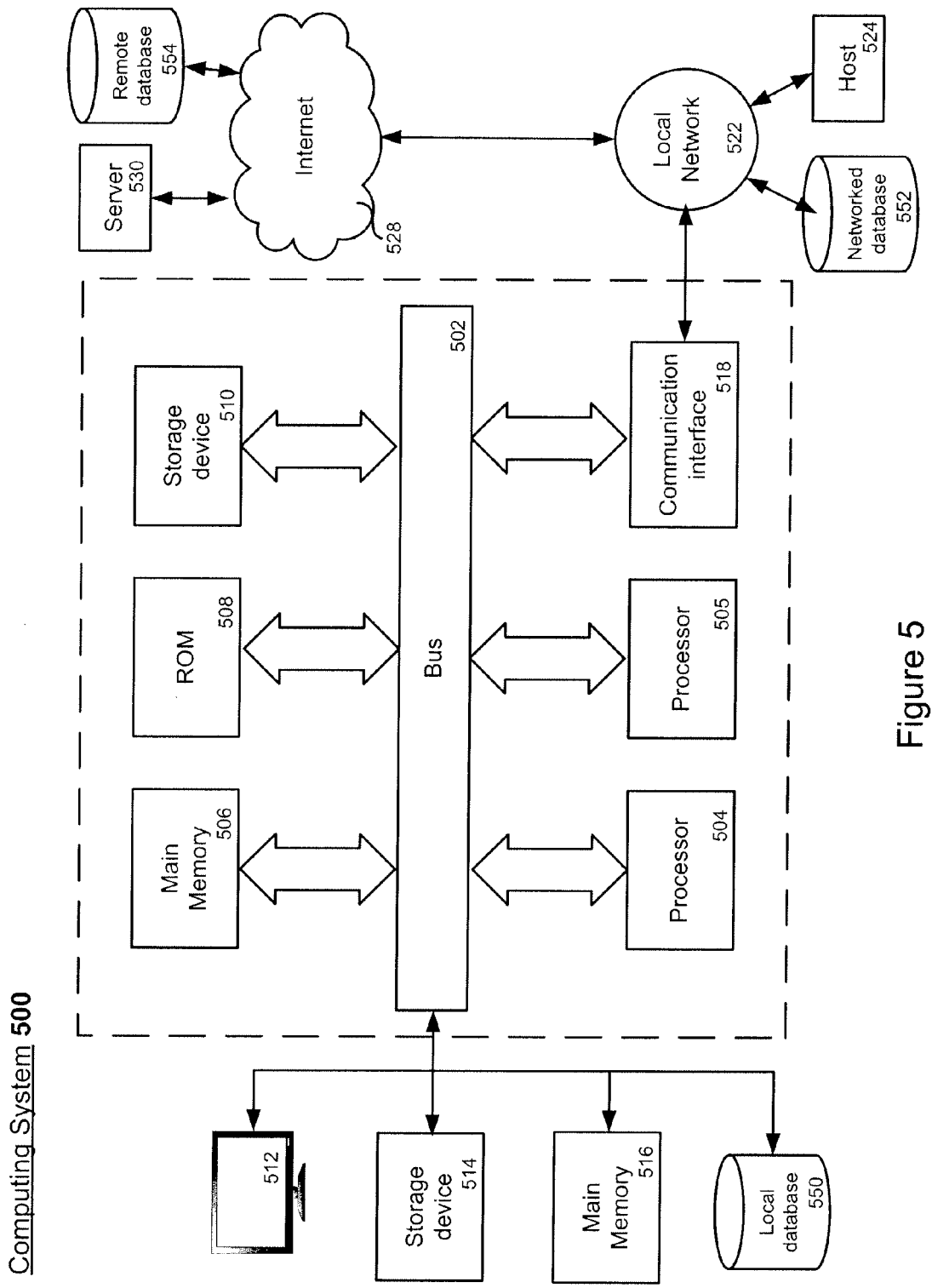
FIG. 5 is a schematic depicting a simplified example of a system constructed according to certain aspects of the invention.

Turning now to FIG. 5, certain embodiments of the invention employ a processing system that includes at least one computing system 500 deployed to perform certain of the steps described above. Computing system 500 may support user interactions with the system. One or more computing system 500 may perform system functions such as search and manipulation of designs and design elements. Computing systems may be a commercially available system that executes commercially available operating systems such as Microsoft Windows®, UNIX or a variant thereof, Linux, a real time operating system and or a proprietary operating system. Furthermore, a database management system may be employed to maintain and query database 550, 552 and/or 554. The architecture of the computing system may be adapted, configured and/or designed for integration in the processing system, for embedding in one or more of an image capture system, a manufacturing/machining system and/or a graphics processing workstation. In one example, computing system 500 comprises a bus 502 and/or other mechanisms for communicating between processors, whether those processors are integral to the computing system 50 (e.g. 504, 505) or located in different, perhaps physically separated computing systems 500.

Computing system 500 also typically comprises memory 506 that may include one or more of random access memory ("RAM"), static memory, cache, flash memory and any other suitable type of storage device that can be coupled to bus 502. Memory 506 can be used for storing instructions and data that can cause one or more of processors 504 and 505 to perform a desired process. Main memory 506 may be used for storing transient and/or temporary data such as variables and intermediate information generated and/or used during execution of the instructions by processor 504 or 505. Computing system 500 also typically comprises non-volatile storage such as read only memory ("ROM") 508, flash memory, memory cards or the like; non-volatile storage may be connected to the bus 502, but may equally be connected using a high-speed universal serial bus (USB), Firewire or other such bus that is coupled to bus 502. Non-volatile storage can be used for storing configuration, and other information, including instructions executed by processors 504 and/or 505. Non-volatile storage may also include mass storage device 510, such as a magnetic disk, optical disk, flash disk that may be directly or indirectly coupled to bus 502 and used for storing instructions to be executed by processors 504 and/or 505, as well as other information.

Computing system 500 may provide an output for a display system 512, such as an LCD flat panel display, including touch panel displays, electroluminescent display, plasma display, cathode ray tube or other display device that can be configured and adapted to receive and display information to a user of computing system 500. In that regard, display 512 may be provided as a remote terminal or in a session on a different computing system 500. An input device 514 is generally provided locally or through a remote system and typically provides for alphanumeric input as well as cursor control 516 input, such as a mouse, a trackball, etc. It will be appreciated that input and output can be provided to a wireless device such as a PDA, a tablet computer or other system suitable equipped to display the images and provide user input.

According to one embodiment of the invention, processor 504 executes one or more sequences of instructions. For example, such instructions may be stored in main memory 506, having been received from a computer-readable medium such as storage device 510. Execution of the sequences of instructions contained in main memory 506 causes processor 504 to perform process steps according to certain aspects of the invention. In certain embodiments, functionality may be provided by embedded computing systems that perform specific functions wherein the embedded systems employ a customized combination of hardware and software to perform a set of predefined tasks. One example is a system or numerically controlled machine that controls a process for transferring images to an object such as a coffee mug or a T-shirt under control and/or directions provided by computing system 500. Thus, embodiments of the invention are not limited to any specific combination of hardware circuitry and software.

The term "computer-readable medium" is used to define any medium that can store and provide instructions and other data to processor 504 and/or 505, particularly where the instructions are to be executed by processor 504 and/or 505 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 504 and 505 or remotely, typically by use of network connection. Non-volatile storage may be removable from computing system 504, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 500. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 504 and/or 505. For example, the instructions may initially be retrieved from a magnetic disk of a remote computer and transmitted over a network or modem to computing system 500. The instructions may optionally be stored in a different storage or a different part of storage prior to or during execution.

Computing system 500 may include a communication interface 518 that provides two-way data communication over a network 520 that can include a local network 522, a wide area network or some combination of the two. For example, an integrated services digital network (ISDN) may used in combination with a local area network (LAN). In another example, a LAN may include a wireless link. Network link 520 typically provides data communication through one or more networks to other data devices. For example, network link 520 may provide a connection through local network 522 to a host computer 524 or to a wide are network such as the Internet 528. Local network 522 and Internet 528 may both use electrical, electromagnetic or optical signals that carry digital data streams.

Computing system 500 can use one or more networks to send messages and data, including program code and other information. In the Internet example, a server 530 might transmit a requested code for an application program through Internet 528 and may receive in response a downloaded application that provides for the anatomical delineation described in the examples above. The received code may be executed by processor 504 and/or 505.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for creating a design. Some of these embodiments comprise receiving a request from a user, the request describing one or more characteristics of a desired design. Some of these embodiments comprise retrieving from a repository of design elements, a set of design elements having at least one characteristic in common with the desired design. Some of these embodiments comprise creating one or more designs from the set of design elements. Some of these embodiments comprise presenting the one or more designs to the user. In some of these embodiments, the design is created automatically from the user request and the design appears to be a direct, relevant response to the request.

Certain embodiments of the invention provide systems and methods for creating a design that can be imprinted on different types of merchandise. Some of these embodiments comprise receiving a request from a user, the request describing one or more characteristics of a desired design. Some of these embodiments comprise generating a list comprising a plurality of design elements. In some of these embodiments, each design element has at least one characteristic in common with the desired design. In some of these embodiments, the list is generated based on a search of a repository of design elements. Some of these embodiments comprise creating a new design comprising design elements selected from the list by the user. Some of these embodiments comprise creating an application of the new design for imprinting on the merchandise. For example, the application can include generating an imprint and/or transfer that can be applied directly to the merchandise. In another example, the application can include melding the design onto an underlying layer of material that is then cut out and applied onto a final surface. Some of these embodiments comprise tagging the new design. In some of these embodiments, tagging the new design includes associating the new design with a characteristic of the desired design.

In some of these embodiments, the repository of design elements includes one or more of graphics, fonts, text, color schemes, layouts, backgrounds, watermarks, textures and borders. In some of these embodiments, generating the list includes searching a catalogue indexed to the repository. In some of these embodiments, each item in the catalogue describes a corresponding design element in the repository. In some of these embodiments, certain items in the catalogue identify metadata associated with corresponding design elements in the repository. In some of these embodiments, each item in the catalogue comprises a tag corresponding to a design element in the repository. In some of these embodiments, searching the catalogue includes creating a query based on a history of prior searches by the user. In some of these embodiments, searching the catalogue includes creating a query based on a history of prior searches by other users.

In some of these embodiments, generating a list includes ordering the plurality of design elements in the list based on a history of prior searches by the user. In some of these embodiments, the request is received from the user through a web page.

Some embodiments of the invention provide systems and methods for producing merchandise on which a design is imprinted. Some of these embodiments comprise receiving a request from a user that includes descriptive terms. Some of these embodiments comprise identifying design elements associated with the descriptive terms in response to the request. Some of these embodiments comprise providing a list of the identified design elements to the user. Some of these embodiments comprise creating a design using certain design elements selected by the user from the list. Some of these embodiments comprise mapping the design to an article of merchandise selected by the user from a list of merchandise. Some of these embodiments comprise automatically transmitting the design to a configurable manufacturing system. In some of these embodiments, the manufacturing system produces at least one example of the article of merchandise having the design imprinted thereon. In some of these embodiments, receiving the request includes analyzing the request to extract the descriptive terms. In some of these embodiments, identifying design elements includes generating a query based on the descriptive terms for searching a database.

Some of these embodiments comprise adding the design to the database. Some of these embodiments comprise adding the design elements selected by the user to the database. In some of these embodiments, generating the query includes prioritizing the descriptive terms. In some of these embodiments, certain design elements comprise one or more graphical image. In some of these embodiments, the design elements include a combination of fonts, text, color schemes, layouts, backgrounds, watermarks, textures and borders. In some of these embodiments, certain design elements comprise text data and one or more fonts. In some of these embodiments, the mapping step includes displaying to the user a plurality of articles having the design superimposed thereon. In some of these embodiments, the plurality of articles includes a coffee mug. In some of these embodiments, the article of merchandise selected by the user is a coffee mug. In some of these embodiments, the design is imprinted by the manufacturing system using a sublimation process. In some of these embodiments, the plurality of articles includes items of clothing. In some of these embodiments, the design is imprinted by the manufacturing system by applying the design onto a surface to produce an appliqué.

Certain embodiments of the invention provide methods for searching a catalogue of images to obtain a design for customizable merchandise. Some of these embodiments comprise receiving a query from a user, the query describing one or more characteristics of a desired design. Some of these embodiments comprise generating a list comprising a plurality of images matching the one or more characteristics based on a search of a repository of images. Some of these embodiments comprise matching an image to an article of merchandise in response to a selection by the user. Some of these embodiments comprise producing a batch of the articles having the identified image applied. Some of these embodiments comprise the step of automatically obtaining a license for the identified image.

In some of these embodiments, generating a list includes searching a catalogue indexed to the repository. In some of these embodiments, each item in the catalogue describes a corresponding image in the repository. In some of these embodiments, certain items in the catalogue identify metadata associated with corresponding images in the repository. In some of these embodiments, each item in the catalogue identifies a tag of a corresponding image in the repository. In some of these embodiments, searching the catalogue includes qualifying the query based on a history of prior searches by the user. In some of these embodiments, searching the catalogue includes qualifying the query based on a history of prior searches by other users. In some of these embodiments, generating a list includes ordering the plurality of items in the list based on a history of prior searches by the user. In some of these embodiments, producing a batch of the articles includes automatically transferring the image and an identification of the article to a device configured to apply the image to the article.

Some of these embodiments comprise receiving a new design from a creator. Some of these embodiments comprise providing a tag for the new design describing a characteristic of the new design. Some of these embodiments comprise determining if the new design is a duplicate of an existing design based on a search of the catalogue using the tag as a search term. Some of these embodiments comprise storing the new design in the repository if the new design is not a duplicate. Some of these embodiments comprise creating an entry in the catalogue identifying the new design and the tag if the new design is not a duplicate. Some of these embodiments comprise providing metadata describing an aspect of the new design if the new design is not a duplicate. In some of these embodiments, metadata is searchable through the catalogue.

Certain embodiments of the invention provide systems and methods for producing merchandise having a design imprinted thereon. Some of these embodiments comprise retrieving a set of design elements from a repository of design elements based on attributes determined from a user query, wherein each design element is associated with at least one of the attributes. Some of these embodiments comprise creating a design using one or more elements selected from the set of design elements. Some of these embodiments comprise presenting to the user, articles of merchandise to which the design is mapped. Some of these embodiments comprise automatically transmitting the design to a configurable manufacturing system in response to selection of one of the articles of merchandise by the user. In some of these embodiments, the manufacturing system produces selected article of merchandise having the design imprinted thereon.

In some of these embodiments, the user query is received from a web page. In some of these embodiments, the attributes are determined by analyzing the query to extract descriptive terms. In some of these embodiments, retrieving a set of design elements includes using the descriptive terms to search a database. In some of these embodiments, analyzing the query includes prioritizing the descriptive terms. In some of these embodiments, certain design elements comprise one or more graphical image. In some of these embodiments, the design elements include a combination of fonts, text, color schemes, layouts, backgrounds, watermarks, textures and borders. In some of these embodiments, certain design elements comprise text data and one or more fonts. In some of these embodiments, the articles of merchandise include a coffee mug. In some of these embodiments, the article of merchandise selected by the user is a coffee mug. In some of these embodiments, the design is imprinted by the manufacturing system using a sublimation process. In some of these embodiments, the articles of merchandise include items of clothing. In some of these embodiments, the articles of merchandise have at least one surface capable of receiving an imprint of the design.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for producing merchandise having a design imprinted thereon, the method comprising:
    providing a computer system with (i) a database storing design elements and (ii) a database management and search system that allows user queries of the database;
    receiving, from the user, a natural language query;
    determining attributes, by the computer system, by analyzing the query to extract descriptive terms;
    searching the database, by the computer system, with the descriptive terms;
    retrieving, by the computer system, a set of design elements from the database, wherein each design element is associated with at least one of the attributes;
    combining, by the computer system, a plurality of the design elements from the set of design elements to create a design, wherein at least one of the plurality of design elements within the design is a graphical image;
    mapping the created design to a plurality of articles of merchandise;
    presenting to the user the plurality of articles of merchandise such that the created design on the plurality of articles of merchandise appears to the user to be responsive to his or her natural language query;
    receiving, from the user, a selection from the plurality of articles of merchandise; and automatically transmitting the created design associated with the selected article of merchandise to a configurable manufacturing system, wherein the manufacturing system produces the selected article of merchandise having the created design imprinted thereon.

2. The method of claim 1, wherein the user query is received from a web page.

3. The method of claim 1, wherein analyzing the query includes prioritizing the descriptive terms.

4. The method of claim 1, wherein at least one of the plurality of the design elements within the design include a combination of fonts, text, color schemes, layouts, backgrounds, watermarks, textures and borders.

5. The method of claim 1, wherein at least one of the plurality of the design elements within the design comprise text data and one or more fonts.

6. The method of claim 5, wherein the plurality of articles of merchandise include a coffee mug.

7. The method of claim 5, wherein the article of merchandise selected by the user is a coffee mug, and wherein the design is imprinted by the manufacturing system using a sublimation process.

8. The method of claim 5, wherein the plurality of articles of merchandise include items of clothing.

9. The method of claim 5, wherein the plurality of articles of merchandise have at least one surface capable of receiving an imprint of the design.

10. A method for producing merchandise having a design imprinted thereon, the method comprising:

receiving, from the user, a natural language query associated with the design;

determining attributes, by one or more processors, by analyzing the query to extract descriptive terms;

searching a database, by the one or more processors, with the descriptive terms;

retrieving, by the one or more processors, a set of design elements from the database, wherein each design element is associated with at least one of the attributes;

combining, by the one or more processors, a plurality of the design elements from the set of design elements to create a design, wherein at least one of the plurality of design elements within the design is a graphical image;

presenting, to the user, a plurality of articles of merchandise, the plurality of articles of merchandise including a first article of merchandise that includes the created design such that the created design appears to the user to be responsive to his or her natural language query; and in response to a selection of the first article by the user, transmitting the created design to a configurable manufacturing system for producing the first article with the created design imprinted thereon.

11. The method of claim 10, wherein the user query is received from a web page.

12. The method of claim 10, further including determining, by use of the one or more processors, the attributes by analyzing the user query to extract descriptive terms.

13. The method of claim 12, wherein the retrieving the set of design elements includes using the descriptive terms to search a database.

14. The method of claim 13, wherein analyzing the query includes prioritizing the descriptive terms.

15. The method of claim 10, wherein the plurality of design elements within the created design includes at least one graphical image.

16. The method of claim 10, wherein the plurality of design elements within the created design include a combination of fonts, text, color schemes, layouts, backgrounds, watermarks, textures and borders.

17. The method of claim 10, wherein the plurality of design elements within the created design comprise text data and one or more fonts.

18. The method of claim 10, wherein the plurality of articles of merchandise includes items of clothing.

* * * * *